April 22, 1952     J. A. THIERRY     2,593,500
TRACTOR IMPLEMENT SUPPORTING CRADLE Filed Feb. 2, 1948     4 Sheets-Sheet 1

John Adams Thierry,
INVENTOR,

BY

ATTORNEY.

April 22, 1952 J. A. THIERRY 2,593,500
TRACTOR IMPLEMENT SUPPORTING CRADLE
Filed Feb. 2, 1948 4 Sheets-Sheet 2

John Adams Thierry,
INVENTOR,
BY Roger Sherman Hoar
ATTORNEY.

April 22, 1952     J. A. THIERRY     2,593,500
TRACTOR IMPLEMENT SUPPORTING CRADLE Filed Feb. 2, 1948     4 Sheets-Sheet 4

John Adams Thierry,
INVENTOR,

BY
ATTORNEY.

Patented Apr. 22, 1952

2,593,500

UNITED STATES PATENT OFFICE 2,593,500

TRACTOR IMPLEMENT SUPPORTING CRADLE

John Adams Thierry, South Milwaukee, Wis., assignor to Bucyrus-Erie Company, South Milwaukee, Wis., a corporation of Delaware Application February 2, 1948, Serial No. 5,837

5 Claims. (Cl. 214—148)

My invention relates to new and useful improvements in tractor-mounted material-handling implements, more particularly to the mounting of the supporting arms and operating means of such implements on the tractor.

In machines of the type to which my invention is more particularly adapted, namely tractor shovels, bulldozers, and tractor cranes, the implement proper is usually mounted on the end of two arms, which straddle the tractor laterally, are pivotally supported by the tractor main frame and/or its traction units, and extend in front of or behind the tractor. Suitable power means is provided for raising and lowering the implement supporting arms. A traction unit is located at each side of the tractor, and may consist of wheels or of a swing frame on which are mounted suitable ground-supports, such as a creeping track, wheels in tandem, runners or skids. The rear of the tractor main frame is supported by a transverse axle which extends across from one swing frame to the other. The forward part of the tractor main frame is supported through an equalizing bolster (or other equalizing means) which permits limited independent movement of the wheels or of the swing frames as the tractor travels over uneven ground. Quite frequently the transverse axle serves also as the axle for the two rear wheels of a wheeled ground-support, or for the two rear tumblers of creeping traction ground-supports.

The principal object of my invention is to improve the mounting on the tractor of implement-supporting arms and operating means, by providing therefore a supporting assembly that will:

(1) Cause the implement to reach forward as it is raised to its highest position.

(2) Transmit digging and load-lifting reactions to the ground without passing through the tractor main frame or interfering with independent movement of the traction units.

(3) Withstand torsional stresses imposed thereon by the implement arms.

(4) Provide unobstructed vision for the operator.

(5) Be simple and inexpensive to manufacture.

(6) Preserve balance and transverse clearance of the tractor.

(7) Be readily attached to the tractor with minimum alteration of the tractor.

In addition to the objects above stated, I have worked out a number of novel and useful details, which will be readily evident as the description progresses.

My invention consists in the novel parts, and in the combination and arrangement thereof, which are defined in the appended claims, and of which two embodiments are exemplified in the accompanying drawings, which are hereinafter particularly described and explained.

Throughout the description, the same reference number is applied to the same member or to similar members.

Referring now to the accompanying drawings, it will be seen that:

Figure 1:
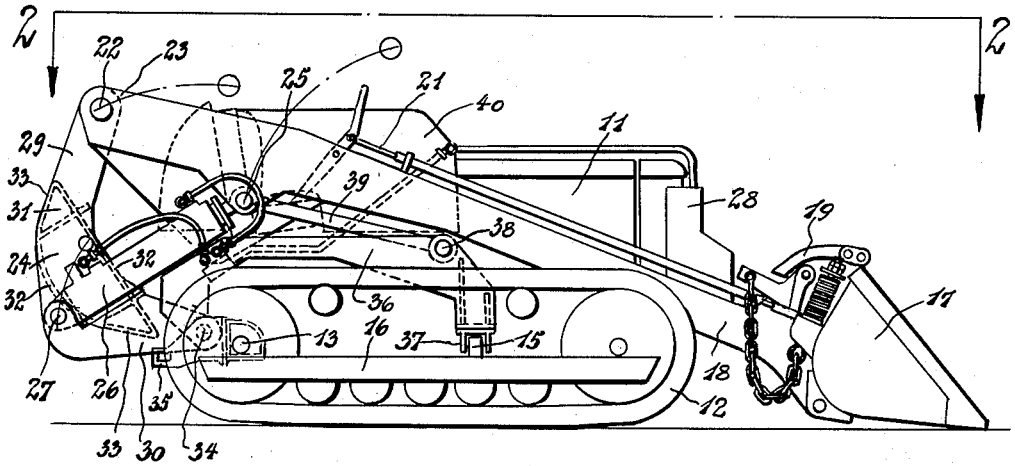
Figure 1 is a side elevation of the first embodiment of my invention represented in the form of a tractor shovel on a track-type tractor with dipper in digging position.
Figure 2:
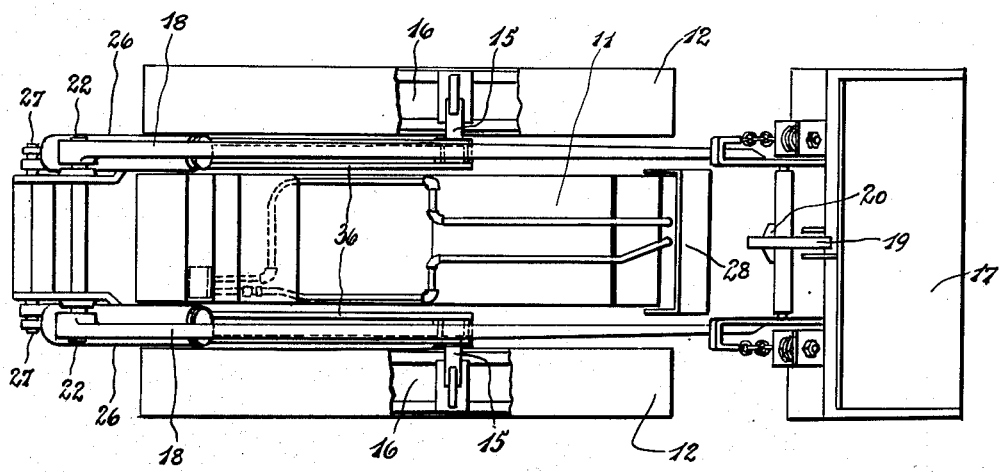
Figure 2 is a plan view, taken along the line 2—2 of Figure 1.

Referring now to Figures 1 to 5 we see that 11 is the main frame of a conventional tractor, supported by two swing frames, which in this embodiment are creeping traction units 12, independently oscillable about rear axle 13 which supports the rear portion of the main frame. The front portion of main frame 11 is pivotally supported at 14 (Figure 4) on the center of cross-bolster 15, which in turn is slidably supported on the swing frame 16 of each of traction units 12, thereby equalizing for the relative oscillation of the swing frames. These details of the tractor form no part of my invention.

Figure 3:
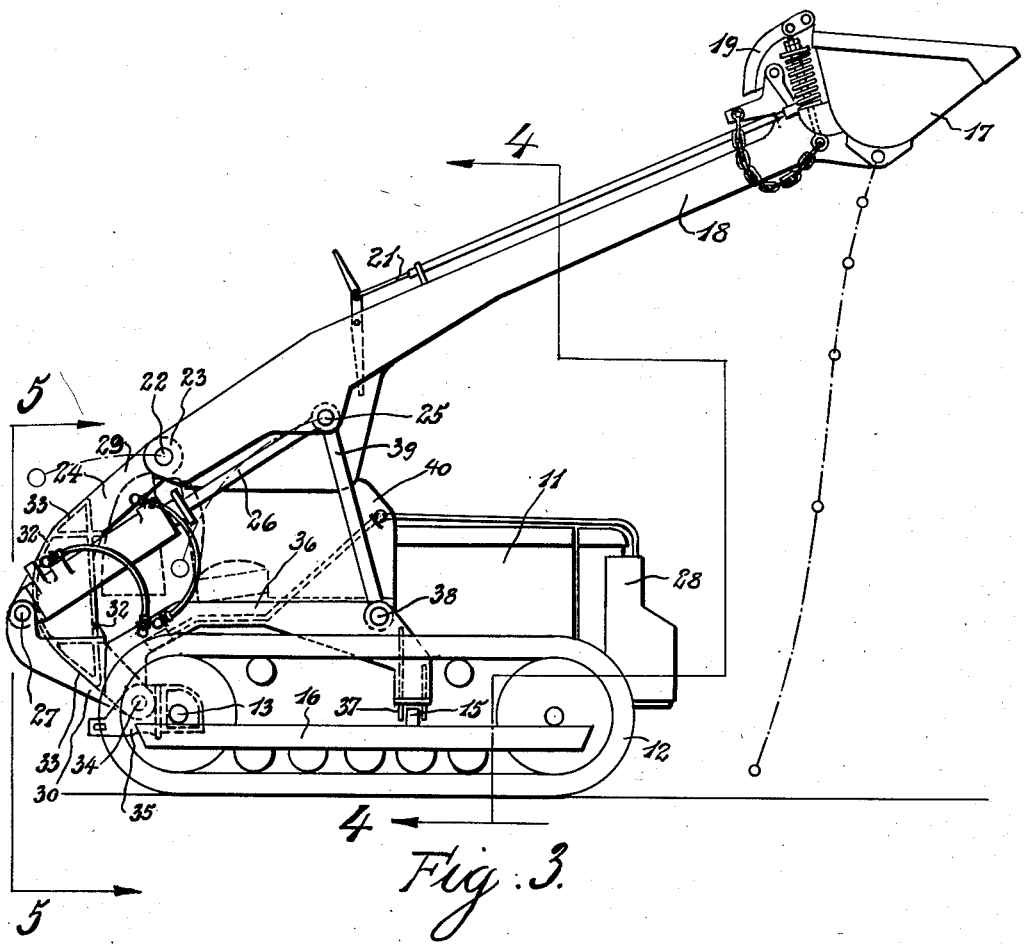
Figure 3 is a side elevation of this tractor shovel in dumping position with broken lines to indicate the respective paths of three principal points of the supporting assembly and dipper.
Figure 4:
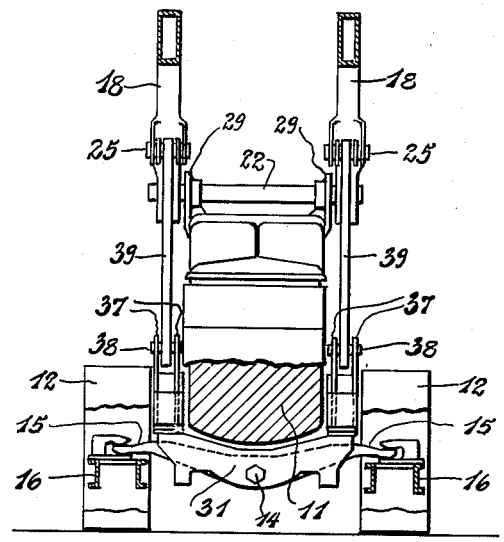
Figure 4 is a front elevation, partly in section, taken along the line 4—4 of Figure 3.
Figure 5:
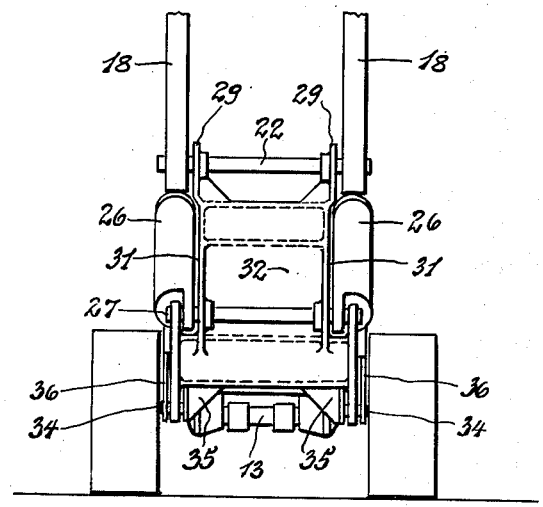
Figure 5 is a rear elevation, taken along the line 5—5 of Figure 3.
Figure 6:
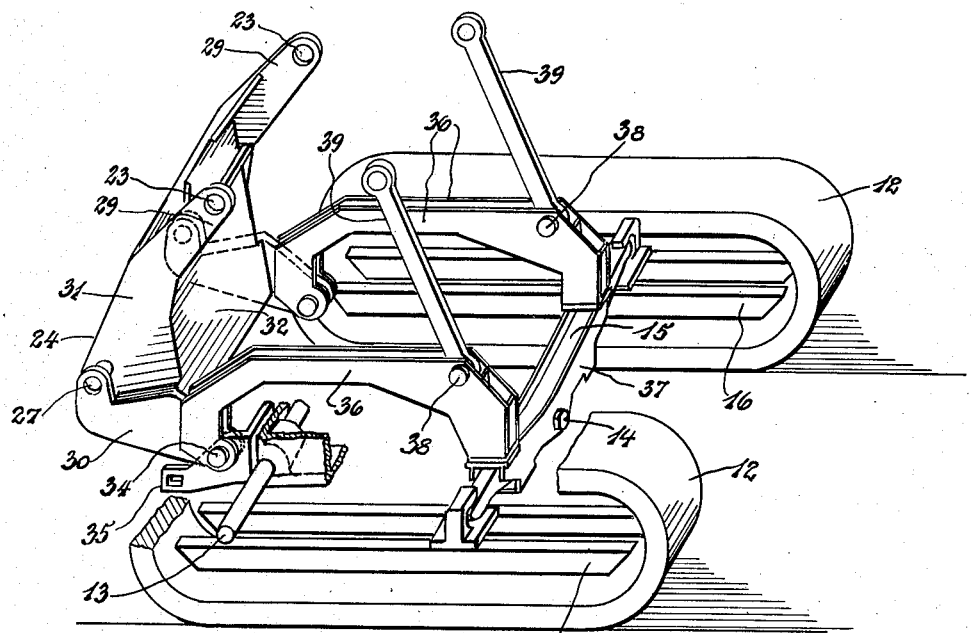
Figure 6 is an isometric view, taken from above to the right in front showing the supporting assembly of my first embodiment and the method of attaching it to the tractor.

The implement supported by the cradle of my first embodiment is a dumpable digging dipper 17 pivoted at the forward end of supporting arms 18. The dipper is held in load-carrying position, as shown in Figure 3, by a dipper latch 19, which can be tripped by lever 20 (Figure 2) controllable in a conventional manner as by operating rod 21.

In place of dipper 17, I could substitute any alternative material-handling implement (such as the dumping bulldozer blade of Patent No. 2,303,379, granted December 1, 1942 to Mork) without thereby departing from the spirit of my invention.

Turning now to the subject-matter of my invention, we see that the rear ends of supporting arms 18 are rigidly connected by cross-shaft 22 which is pivotally mounted in bearings 23 at a high rearward point on each side of rear link 24 of the cradle. Supporting arms 18 and cross-shaft 22 are described in my claims as an "implement frame." To an intermediate point 25 on each arm 18 there is pivoted an hydraulic cylinder-piston assembly 26 which is also pivotally supported preferably on rear link 24 preferably at a rearward and relatively low point as at 27. The two cylinders are interconnected and their pistons are actuated by pressure fluid supplied from a conventional hydraulic unit 28 at the front of the tractor. Cylinder-piston assemblies 26 could also be connected between other elements of the quadilateral linkage formed by the rear link 24, supporting arms 18, front links 39 (hereinafter described) and side beams 36 (hereinafter described) which form the tractor-mounted base supporting these links.

Rear link 24 consists of upwardly extending side arms 29 (to which the implement arms are pivoted), downwardly extending side legs 30, and a main body in the form of a transverse torsion box made up of side plates 31, front and back plates 32, and top and bottom plates 33, all welded together. Although this location and construction for the torsion element of my rear link is highly preferable, all that is essential is that this or some equivalent means be provided to effectively resist relative pivotal movement of the two side portions of this rear link. This torsion box serves to distribute to the rear link supports any unequal forces imposed on it by the implement-supporting arms.

In some of my claims I refer to this rear-link assembly as a "torsion-box assembly," and in other claims as a pair of links rigidly connected by a torsion box.

Rear link 24 is pivotally supported at each side of the tractor by pins 34 on legs 30 to brackets 35 on that portion of the tractor main frame just behind axle 13.

The stress introduced by attaching the rear link to the main frame just behind the rear axle instead of attaching it directly to the rear axle can be neglected. Thus in either case the attachment can be considered to be "substantially at" the rear axle: i. e., practically coaxial therewith.

Also mounted on brackets 35 are the rear ends of side beams 36 which extend forwardly to cross-beam 37, to the ends of which they are bolted. In some of my claims I refer collectively to side-beams 36 and cross-beam 37 as a "supporting frame." Cross-beam 37 is pivotally supported at 14 on the center of cross bolster 15 in the manner more particularly described in U. S. Patent No. 2,519,974 issued August 22, 1950, to George W. Mork for improvements in tractor-implement supporting cradle.

Figure 7:
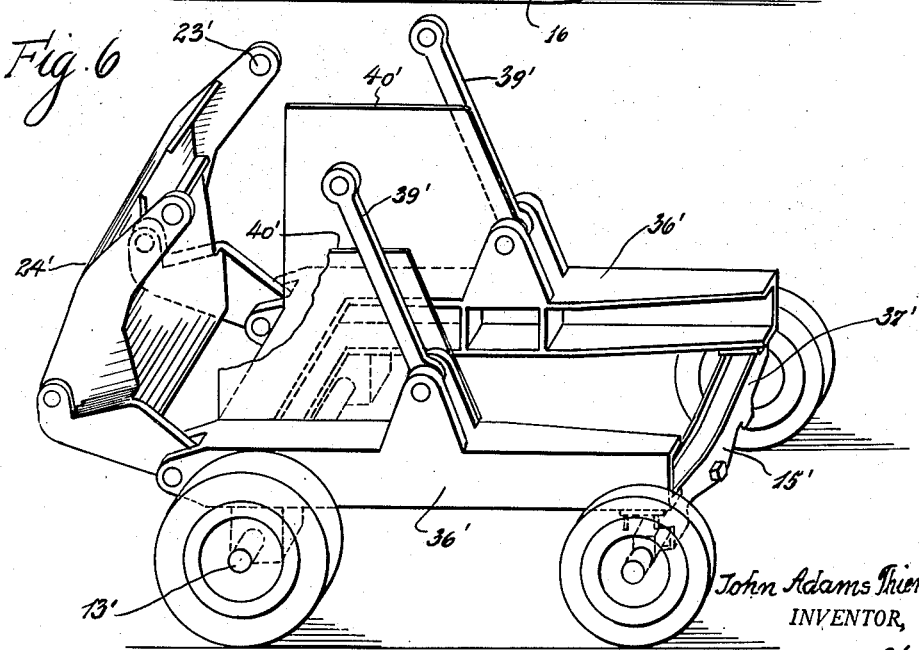
Figure 7 is a similar isometric view of a second embodiment of my invention adapted to a wheel-type tractor.

Although in Figures 1-6, I show the rear link 24 supported, together with side beams 36, on brackets 35 of the tractor, it is evident that the rear link 24 may be indirectly mounted on this portion of the tractor (i. e., substantially at the rear axle of the tractor), by being pivoted on the side beams 36 which are in turn mounted on that portion of the tractor. Such an equivalent arrangement is shown in Figure 7 (second embodiment) where support of the side beams exactly on the rear axle is also shown. In other words, so long as the point of support (direct or indirect) of the rear link on the tractor is at or near the rear axle, the location of the rear link pivot close to such axle is less important.

Pivotally mounted at the forward end of side beams 36, as at 38 are front links 39 which are pivotally connected at their other end to an intermediate point on the implement-supporting arms 18, as at 25. These links 39 are of such length (relative to the length of rear link 24) and the location of their pivot connection 25 to the implement-supporting arms 18 are so chosen that:

(1) When the implement is lowered in digging position (Figure 1), each link 39 and the supporting arm 18 to which it is attached are in substantial alignment, so that the digging reactions are transmitted directly through the links 39 to the side beam 36 on which they are mounted and thence to the ground through the rear axle 13 and front cross-bolster 15 and the traction units 12, without passing through and stressing the tractor main frame and without imposing substantial pressure on the cylinder-piston assemblies 26; and (2) When the implement is raised in dumping position (Figure 3) the dipper 17 is substantially forward of its position in digging and carrying positions, making it possible to spot the load without moving the tractor forward.

Guard plate 40, preferably mounted on side beams 36 serves to protect the operator from the jackknifing action of the moving parts.

From the foregoing it will be seen that my supporting assembly for supporting and controlling the movement of the implement supporting arms on the tractor comprises (Figure 6): rear link 24 with its torsion box, front links 39, side beams 36, and front cross-beam 37, the links being actuated by cylinder-piston assemblies 26, and the whole mechanism having a three-point support substantially independent of the tractor main frame. Furthermore the entire supporting assembly can be easily mounted on a tractor with practically no modification of the tractor, by merely attaching the side beams 36 and rear link 24 to the tractor brackets 35, fitting the U-shaped cross-beam 31 around cross-bolster 15, and bolting the side-beams 36 to the ends of cross-beam 37.

Turning now to Figure 7, we see my supporting assembly adapted for a wheel-type tractor which has no swing frames. The rear wheels and the rear end of the assembly (i .e., the side beams 36') are mounted directly on the rear axle 13' of the tractor, and the front wheels and the front end of the assembly are mounted directly on the cross-bolster 15'. As in my first embodiment, the supporting assembly consists of: side beams 36' rigidly connected at the front by cross-beam 37' and pivotally connected at the rear to torsion-box assembly 24'; guard plates 40' on side beams 36'; the torsion-box assembly 24' with its bearings 23' to receive the rear end of the implement-supporting arms; and front links 39' to guide the implement arms and to transmit reactions from the implement frame to the side beams 36' and cross-beam 37'.

Having now described and illustrated two alternative forms of my invention, I wish it to be understood that my invention is not to be limited to the specific forms or arrangements of parts herein decribed or shown.

I claim:

1. In a material-handling apparatus for attachment to a tractor having a main frame, first support means pivotally connected to the main frame adjacent the rear thereof, and second support means forwardly spaced from the pivotal connection of the first support means to the main frame, the combination of: an implement frame; an implement supported by the implement frame, and the following described mechanism for supporting and manipulating the implement frame: a cross-beam adapted to be pivotally supported by the second support means for relative movement about a central longitudinal axis of the tractor; a pair of side members rigidly connected at one end to the cross-beam and adapted to be connected at their other end to the main frame of the tractor at transversely-spaced points adjacent the rear of the main frame; a transverse torsion box; a pair of upper support members rigidly connected to the torsion box respectively adjacent its ends, and pivotally connected to the implement frame; a pair of lower support members rigidly connected to the torsion box respectively adjacent its ends, and adapted to be pivotally supported by the main frame, adjacent the connection of the side members to the main frame, for fore-and-aft movement; a pair of link members pivotally connected to the implement frame forwardly of the pivotal connection between the implement frame and the upper support members, and respectively pivotally supported by the side members for fore-and-aft movement about an axis located forwardly of the pivotal connection of the lower support members to the side members; and power-actuated means, having forward operative connections to points adjacent the pivotal connections of the link members to the implement frame and rearward operative connections to points adjacent the ends of the torsion box, to move said forward connections forwardly and upwardly and thereby raise the implement frame, the rearward connections also moving forwardly and upwardly, but to a lesser degree than said forward connections, thereby offsetting some of the movement, and effectively diminishing the travel, of the forward connections relative to the rearward connections of said power-actuated means.

2. A material-handling apparatus according to claim 1, further characterized by the fact that said mechanism is adapted to have a three-point support on the tractor, two of the support points being on the main frame adjacent the pivot axis of the first support means and the third support point being on the second support means.

3. In a material-handling apparatus for attachment to a tractor having a main frame, first support means pivotally connected to the main frame adjacent the rear thereof, and second support means forwardly spaced from the pivotal connection of the first support means to the main frame, the combination of: an implement frame; an implement supported by the implement frame, and the following-described mechanism for supporting and manipulating the implement frame: a transverse torsion box; a pair of upper support members rigidly connected to the torsion box respectively adjacent its ends, and pivotally connected to the implement frame; a pair of lower support members rigidly connected to the torsion box respectively adjacent its ends, and adapted to be pivotally supported by the tractor adjacent the rear end of the main frame for fore-and-aft movement; a supporting frame adapted to be pivotally supported at its forward end by the second support means on a central longitudinal axis of the tractor and to be connected at its rear end to the tractor at transversely-spaced points; a pair of link members pivotally connected at one end to the implement frame forwardly of the pivotal connection between the implement frame and the upper support members, and pivotally connected at the other end to the supporting frame for fore-and-aft movement about an axis located adjacent the forward end of the supporting frame; and power-actuated means, having forward operative connections to points adjacent the pivotal connections of the link members to the implement frame and rearward operative connections to points adjacent the ends of the torsion box, to move said forward connections forwardly and upwardly and thereby raise the implement frame, the rearward connections also moving forwardly and upwardly, but to a lesser degree than said forward connections, thereby offsetting some of the movement, and effectively diminishing the travel, of the forward connections relative to the rearward connections of said power-actuated means.

4. A material-handling apparatus according to claim 3, further characterized by the fact that the lower support members are pivotally connected to the main frame and to the rear end of the supporting frame on an axis adjacent the pivotal connection of the first support means to the main frame.

5. In a material-handling apparatus for attachment to a tractor having a main frame, first support means pivotally connected to the tractor adjacent the rear thereof, and second support means forwardly spaced from the pivotal connection of the first support means to the tractor, the combination of: an implement frame; an implement supported by the implement frame, and the following-described mechanism for supporting and manipulating the implement frame: a transverse torsion box assembly; means pivotally connecting the ends of said assembly to the rear of the implement frame; means adapting said assembly to be pivotally supported by the tractor at transversely-spaced points adjacent its rear end; link means pivotally supporting the implement frame forwardly of its pivotal connection to said assembly; a supporting frame pivotally supporting the link means for fore-and-aft movement and having a three-point support on the tractor; and means to raise and lower the implement frame said means including a pair of cylinder-piston assemblies respectively pivotally connected at one end to the ends of the torsion box assembly and at the other end operatively to the implement frame, the pivotal connections at the rearward end of said cylinder-piston assemblies moving upwardly and forwardly sumultaneously with, but to a lesser degree than, the pivotal connections at the forward end of said assemblies, thereby partly offsetting the movement of the forward pivotal connections and effectively diminishing the stroke of said cylinder-piston assemblies.

JOHN ADAMS THIERRY.

REFERENCES CITED

The following references are of record in the file of this patent:

UNITED STATES PATENTS

| Number | Name | Date |
| --- | --- | --- |
| 1,710,632 | Main et al. | Apr. 23, 1929 |
| 2,269,775 | Le Bleu | Jan. 13, 1942 |
| 2,332,742 | Mott | Oct. 26, 1943 |
| 2,391,224 | Carter | Dec. 18, 1945 |
| 2,455,474 | Drott et al. | Dec. 7, 1948 |
| 2,519,974 | Mork | Aug. 22, 1950 |